United States Patent
Breuckheimer et al.

(10) Patent No.: US 6,496,508 B1
(45) Date of Patent: Dec. 17, 2002

(54) COMMUNICATION SYSTEM ARCHITECTURE AND METHOD OF ESTABLISHING A COMMUNICATION CONNECTION THEREIN

(75) Inventors: Simon Daniel Breuckheimer, London (GB); Roy Harold Mauger, Radlett (GB); Julian Frank Barry Cable, Bishop's Stortford (GB); Stephen Evans, Welwyn Garden City (GB); Steve Leonard Fagg, Harlow (GB); Sarah Lucy Wright, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/190,074

(22) Filed: Nov. 12, 1998

(51) Int. Cl.$^7$ ................................................ H04L 12/66
(52) U.S. Cl. ....................................... 370/397; 370/465
(58) Field of Search .................................. 370/351–360, 370/384, 385, 397, 395.2, 401, 409, 410, 465, 466, 467; 379/219, 220.01, 221.1, 229

(56) References Cited

U.S. PATENT DOCUMENTS

| | | | | |
|---|---|---|---|---|
| 5,483,527 A | * | 1/1996 | Doshi et al. ................ | 370/465 |
| 5,940,393 A | * | 8/1999 | Duree et al. ................ | 370/466 |
| 6,009,100 A | * | 12/1999 | Gausmann et al. ......... | 370/466 |
| 6,023,474 A | * | 2/2000 | Gardner et al. ............ | 370/410 |
| 6,061,363 A | * | 5/2000 | Evans et al. ................ | 370/467 |
| 6,069,947 A | * | 5/2000 | Evans et al. ................ | 379/229 |
| 6,298,043 B1 | * | 10/2001 | Mauger et al. ............. | 370/248 |

OTHER PUBLICATIONS

AF–VTOA–0089.000, Voice and Telephony Over ATM–ATM Trunking using AAL1 for Narrowband Services Version 1.0, pp. 1–32, Jul. 1997.*
Doshi et al., Protocols, Performance, and Controls for Voice over Wide Area Packet Networks, Bell Labs Technical Journal, pp. 297–337, Oct.–Dec. 1998.*

* cited by examiner

*Primary Examiner*—Wellington Chin
*Assistant Examiner*—Frank Duong
(74) *Attorney, Agent, or Firm*—Lee, Mann, Smith, McWilliams, Sweeney & Ohlson

(57) ABSTRACT

To segregate functionality and to eliminate redundancy in service logic and associated hardware that together control the interconnection of narrowband trunk circuits (252–256) and broadband virtual channels (258–262) of a mixed node communication system (FIG. 5), a switch fabric (16) has an associated memory (280) that contains a pre-provisioned table of mappings between narrowband trunk circuits (DS-0s) and broadband virtual channel identities. Therefore, to establish an end-to-end connection, the switch fabric (16) searches the pre-provisioned table (280) for an available connection and then performs the necessary cross-connection between the narrowband trunk circuit is (252–256) and the broadband virtual channel (258–262). The mappings principally relate to the narrowband-to-switch fabric interface and, as such, avoid the requirement for UNI signalling translation and negotiation, although the mappings may also include the broadband-to-switch fabric interface.

19 Claims, 4 Drawing Sheets

*Fig. 1*: Prior Art

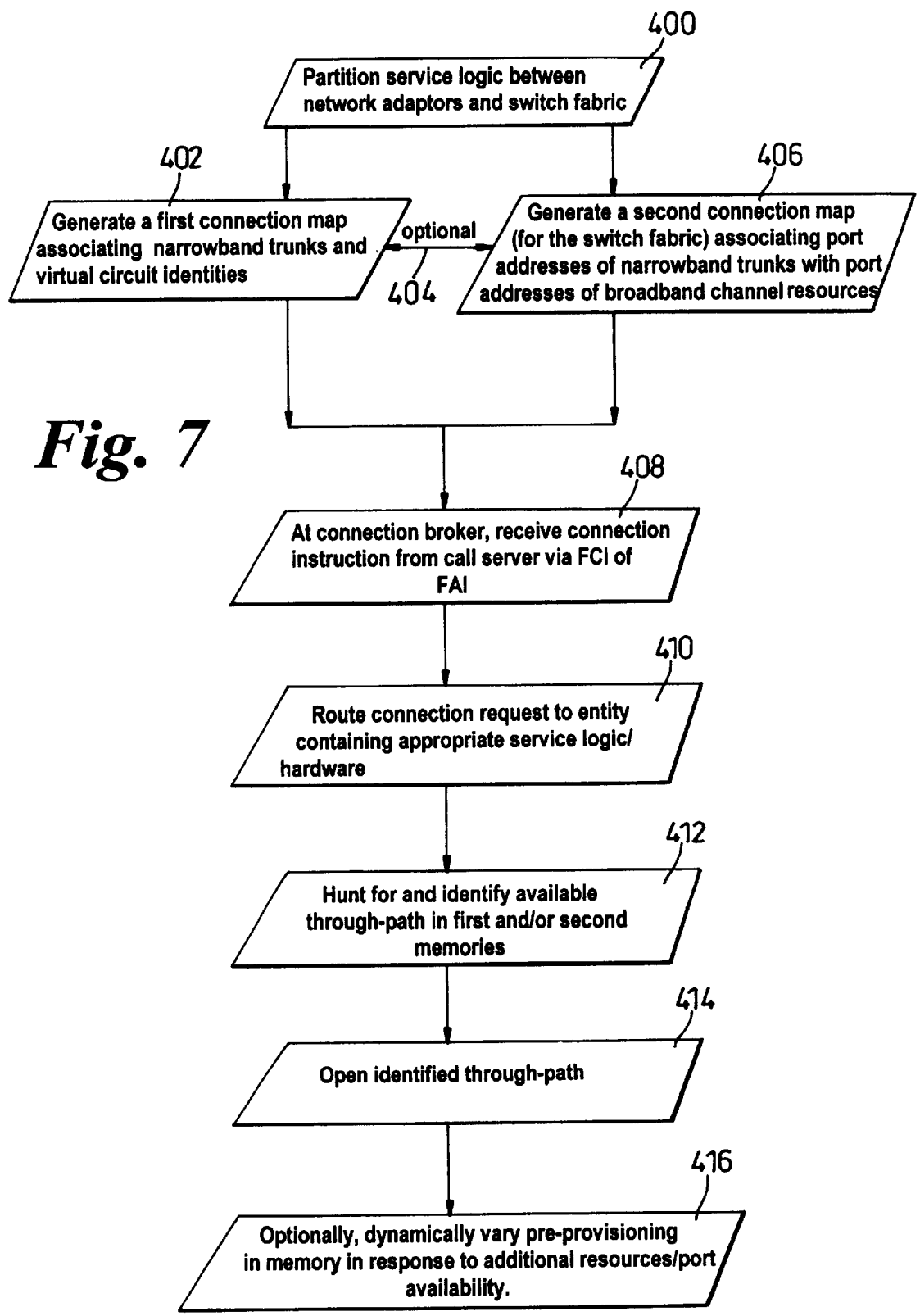

COMMUNICATION SYSTEM ARCHITECTURE AND METHOD OF ESTABLISHING A COMMUNICATION CONNECTION THEREIN

RELATED PATENT APPLICATIONS

The present application is related to co-pending U.S. patent application Ser. No. 08/991,272 [Applicant's reference FPUS97691/ID0843] filed on Dec. 16, 1997 in the name of J.F.B. Cable et al. and assigned to Northern Telecom Limited, which co-pending U.S. patent application is further identified by its title "COMMUNICATION SYSTEM ARCHITECTURE AND OPERATING PROTOCOL THEREFOR.

BACKGROUND TO THE INVENTION

This invention relates, in general, to a communication system architecture and a method for establishing a communication, and is especially applicable to the interconnection and signalling requirements of a switch fabric interface that couples a narrowband network to broadband functionality. The present invention is particularly, but not exclusively, applicable to a connection regime that effectively connects communication traffic on a trunk circuit in the synchronous domain to a packetised data environment supported on virtual circuits of an asynchronous domain.

SUMMARY OF THE PRIOR ART

Globally, telecommunication systems are, generally, in a transitional phase between second generation, narrowband digital networks (such as the Global System for Mobile (GSM) cellular communication system) and future, multimedia digital networks (such as the Universal Mobile Telecommunication System (UMTS)) having broadband capabilities. This transition is necessarily required to support higher data rate communications, including video and Internet applications, presently being proposed and made available.

Unfortunately, this transitional phase also presents system operators with several dilemmas, and prejudices immediate implementation of such broadband systems. For example, until such a time when a free-standing broadband system becomes an accepted and freely available standard for all subscriber terminals (such as cellular telephones and data transmission devices), system operators are reticent to write-off their significant investments in current narrowband infrastructure technology. Indeed, such narrowband infrastructure technology already provides a rich set of services and service creation environments that would have to be re-implemented for deployment in broadband networks. Consequently, present-day narrowband systems must be adapted to accommodate both narrowband and broadband users; with this statement particularly relevant to service and system management, call establishment and inter-working procedures between these different forms of network.

For an effective migration between narrowband and broadband systems (for the transitional phase), system operators must particularly consider an inter-working scenario when all subscribers connect to a narrowband network, but one or more intermediate broadband networks are used to relay information between these narrowband subscribers. Any interim solution should also optimise service and system management, while also providing infrastructure equipment that can be re-used in a fully-fledged broadband environment.

In more detail, telecommunication networks comprise nodes connected by communication resources (usually termed "links"), with a particular network technology characterised by the means of transmission of user and control information along these links and also by the routing and relaying functions embodied in the nodes. The term routing is used to describe the process of determining the path the information will take through the network, while relaying is the process of transferring information from one link to another, i.e. the information is merely passed, without alteration, from one channel resource to another. Routing and relaying functions are therefore core to the development of an efficient system having optimised service capabilities, with operator profits and subscriber service charges inherently entwined with such optimisation.

Taking GSM as an exemplary form of a narrowband digital network, user and control information (or "data") is interleaved, using time division multiplexing (TDM), on a 64 kbit per second (kbps) pulse code modulated (PCM) bearer channel. Indeed, these bearer channels can each be framed to support four voice calls of 16 kbps, comprised from 13 kbps of sampled and encoded speech and 3 kbit/s of ancillary information, such as parity check and correction bits (and the like) and synchronisation information. Data is then relayed across a node by some form of synchronous TDM switching fabric, often of the 'time-space-time' type. Control information (e.g. call set-up and tear-down messages) logically follows the same path (although not always the same physical path) through the network as user information, and is terminated in each node for routing purposes. Routing is conventionally performed, in each node, on a 'hop-by-hop' basis using long lived routing tables, i.e. the node is sufficiently intelligent to determine an optimum route for the succeeding network connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). In fact, the most common digital access signalling schemes are Common Channel Signalling Systems, such as the Integrated Service Digital Network (ISDN) DSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

On the other hand, broadband digital networks are characterised in that user and control information is transmitted in fixed or variable length "packets" or "cells", with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

Another significant problem associated with prior art narrowband-broadband interfaces arises with architectural change. For example, the introduction of new or up-graded infrastructure can have unwanted ramifications throughout the entire communication system because changes in the inter-working relationships between the network controller (e.g. a call server) and the narrowband-broadband interface can potentially alter network identities and addresses. More particularly, the configuration of the narrowband-broadband interface may change (as a result of either the inclusion of additional equipment, the up-grading of existing equipment, or the failure of a particular system entity), while the call server remains oblivious to this change because of the uniform fabric application interface between the call server and the fabric control software. Consequently, the system (generally) may not necessarily be exploited and optimised to its greatest potential. Network providers may therefore also be discouraged from implementing the further development of existing networks since global system changes may be required, with such system changes being both time consuming and complex in nature.

To facilitate use of broadband networks and the migration of communication networks to high data rate technologies (e.g. the 2 Mbps rate envisaged within UMTS), there is a need to provide an effective mechanism for interconnecting narrowband networks through a transparent broadband ether, while also providing an easy migration to more advanced systems. Moreover, to encourage subscription to broadband services, operators must provide a reliable but relatively low-cost (and hence optimised) communication system architecture. Furthermore, the broadband ether must accommodate and support narrowband signalling schemes without effecting either data integrity or in any way inhibiting data flow or interconnection.

One particular and prominent disadvantage or drawback associated with the interworking and interconnection of narrowband networks with a broadband backbone is that there is a significant time and processing overhead associated with actually establishing the physical connection between the different networks. Specifically, the ATM Forum User Network Interface (UNI) can be considered both to define a reference point within a system architecture (especially in the context of an interface between an ATM switch fabric and either a narrowband network or a broadband network), and also the requisite signalling protocols for traffic and control information. In other words, UNI defines the system (particularly the interface) connectivity and inter-working function between the different portions of the system. For example, with respect to a network access peripheral that provides coupling of narrowband trunk circuits to the ATM switch fabric, UNI may define ATM adaptation layer 1 (AAL-1) for traffic and Q.2931 for signalling.

Presently, the requirements imposed in the UNI necessarily demand a plethora of request and response messages signals to sent over a signalling channel dedicated to support the numerous call processing functions; with these messages determining the form of the connection and ultimately identifying the route for the connection. Indeed, UNI stipulates that the assignment of virtual channel identities (VCIs) and virtual path identities (VPIs) is accomplished through negotiation between an ATM entity and the ATM network proper. As such (and in relation to existing interfaces between narrowband and broadband networks), UNI demands that an ATM switch fabric (for example), in response to a connection request on an in-coming port, routes the request (in an appropriate form) to the broadband (ATM) network. The switch fabric must then await a response from the ATM network indicating an assigned VPI/VCI (virtual path identity/virtual circuit identity) for the voice/data call; the switch fabric can then associate the assigned VPI/VCI to an output port that acts to interface the switch fabric to the broadband network. The switch fabric then records this assigned VPI/VCI with the input VPI/VCI, as an association. Finally, the switch fabric executes an internal cross-connect between the identified input and output ports (by virtual of being able to resolve the respective VPI/VCI assignments and hence to enable an interworking function) to establish connection of the narrowband trunk to the ATM network.

The elimination of specific signalling demanded by UNI in the connection establishment procedure would clearly result in both a faster call connect and a function that was less processor intensive. However, such elimination of control signalling overhead should not jeopardise the compliance of any such modified interface with respect to an established Technical Standard, nor should its adoption significantly disrupt the configuration of installed infrastructure.

SUMMARY OF THE INVENTION

According to a first aspect of the present invention there is provided a method of communicating information between narrowband circuits and broadband channel resources across an interface having a processor for controlling connection therebetween and an associated memory, the method comprising the steps of: pre-provisioning connection paths between narrowband circuits and broadband channel resources and storing these pre-provisioned connection paths in memory as connection identifiers; and in response to the interface receiving an instruction to connect narrowband circuits and broadband channel resources, having the processor establish a connection path using available pre-provisioned connection identifiers.

The connection identifiers associate port addresses of the interface to pre-provisioned connection paths.

In a preferred embodiment, the method further comprises at least one of the steps of: pre-storing VPI/VCI information pertaining to end points of a cross-connect and establishing a connection between a narrowband trunk to a pre-provisioned network virtual channel connection (VCC) using the stored VPI/VCI information; and establishing a cross-connect to a virtual channel by first determining a VPI/VCI of a demand assigned channel connection.

In another embodiment, at least one call server administers the set-up of a call and the method further comprises the steps of: using a generic end point as a termination point of the switch responsive to a call server associated with a called party; and establishing the virtual channel connection for an inter-node trunk based on the generic end-point.

In another aspect of the present invention there is provided an interface of a wireline communication system arranged to interconnect narrowband circuits and broadband channel resources, the interface comprising: a memory containing a plurality of connection identifiers defining pre-provisioned connection paths between narrowband circuits and broadband channel resources; and a controller associated with the memory and arranged to control a call connection within the interface in response to call connect instructions, the controller configured to access the pre-provisioned connection identifiers to identify an available connection path and, in response thereto, to establish the call connection using the available connection path.

In a further aspect of the present invention there is provided a hybrid narrowband-broadband wireline communication system comprising: a) at least one call server that administers the set-up of a call supported on narrowband trunks and broadband channel resources; b) an interface, coupled to a call server, arranged to interconnect the narrowband trunks and broadband channel resources of the hybrid narrowband-broadband wireline communication system, the interface further comprising: a memory containing a plurality of connection identifiers defining pre-provisioned connection paths between narrowband trunks and broadband channel resources; and a controller associated with the memory and arranged to control call connection within the interface, the controller configured to access the pre-provisioned connection identifiers to identify an available connection path and, in response thereto, to support the call using the available connection path.

Advantageously, the present invention provides a communication system architecture that can operate across mixed nodes having narrowband and broadband capabilities to establish efficiently and quickly a through-path or an end-to-end connection. For example, the through-path might be from a calling party or a network adaptor of an interface to a called party (such as another subscriber terminal or an intelligent peripheral, e.g. a network gateway to value added services), or may need to be established in-call to support a new connection or routing function.

In another aspect of the present invention there is provided an interface coupled to a call server arranged to administer call connection in a communication system, the interface comprising: a connection broker responsive to the call server and arranged to facilitate interconnection of a call through the interface; at least one network adaptor coupled to the connection broker, the at least one network adaptor providing access to at least one narrowband trunk; and a switch fabric coupled to the at least one network adaptor and responsive to the connection broker, the switch fabric providing access to a plurality of broadband channel resources; wherein the connection broker is arranged to direct separate and functionally distinct service logic to the switch fabric and the plurality of network adaptors.

Beneficially, the system architecture of present invention can support simplified signal processing at the network adaptor and the switch fabric by virtue of functionality being more effectively partitioned. Specifically, a processor of the network adaptor can be simplified by restricting its performance to, principally, voice processing features, such as echo cancellation and through-path control, while a switch fabric performs dedicated space switching, e.g. scaling and connectivity functions between a narrowband node and a broadband network.

BRIEF DESCRIPTION OF THE DRAWINGS

An exemplary embodiment of the present invention will now be described with reference to the accompanying drawings, in which:

FIG. 1 is a block diagram illustrating an abstract model of a narrowband communication node;

FIG. 7 is a flow diagram illustrating an operating regime of a preferred embodiment of the present invention, as supported by the preferred architectures of FIGS. 5 and 6.

DETAILED DESCRIPTION OF A PREFERRED EMBODIMENT

Figure 2:
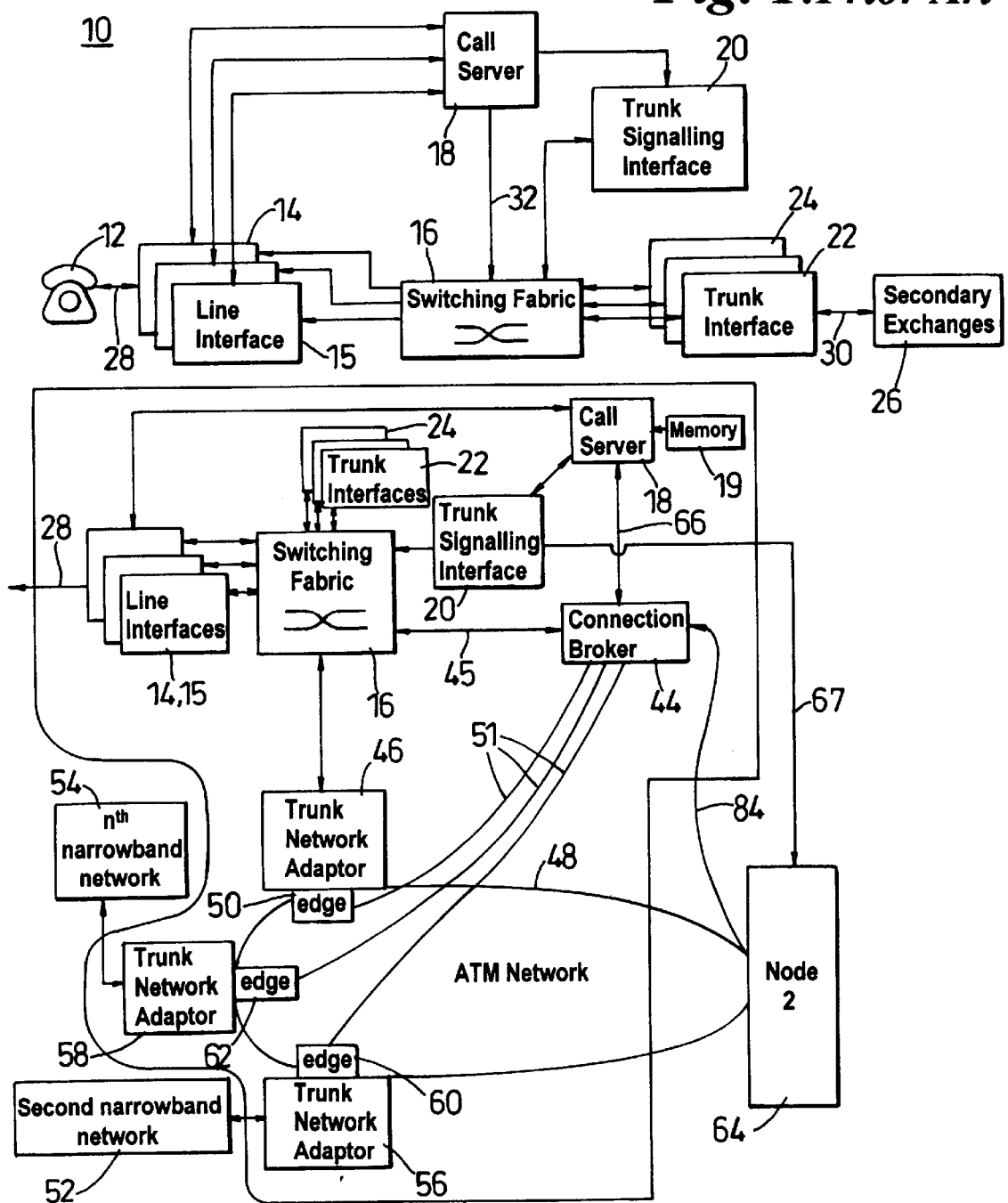
FIG. 2 is a block diagram illustrating an underlying principle for subscriber terminal interconnection between narrowband and broadband networks, as required in the present invention.

Referring to FIG. 1, a block diagram illustrating an abstract model of a narrowband communication node 10 is shown. A number of subscriber terminals 12, such as landline telephones or modems, are coupled, typically, to a plurality of line interfaces 14–15 (although only one need be supplied for an operational system). The plurality of line interfaces 14–15 are each connected to a switching fabric 16 that is arranged to route an input of the switching fabric 16 to an appropriate output thereof, as will readily be appreciated. The plurality of line interfaces 14–15 are also coupled (usually on an individual basis) to a call server 18 arranged to administer and control, for example, the set-up and tear-down of calls across the narrowband network. The call server 18 is further coupled to the switching fabric 16. A trunk signalling interface 20, that acts to decode and interpret signalling schemes used within the narrowband network 10, is coupled between the call server 18 and the switching fabric 16. Outputs from the switching fabric 16 are coupled to a plurality of trunk interfaces 22–24 (although only one need be supplied for an operational system). The plurality of trunk interfaces are further coupled to secondary exchanges 26, such as PBXs or BSSs, within the narrowband network 10.

As will be appreciated, the term "subscriber terminal" is used merely to describe a particular endpoint connection for a line or trunk interface.

User information (traffic) 28–30 enters the narrowband infrastructure via line interfaces 14–15 or trunk interfaces 22–24. Control information from individual subscribers enters via the line interfaces 14–15, whereas control information, i.e. inter-node signalling, from connected trunked networks (e.g. the secondary exchanges 26) can enter either via the same trunks as the traffic 30 or through the use of dedicated channel resources (not shown). The call server 18 processes incoming call requests and selects an appropriate outgoing trunk or line, as will readily be appreciated. More particularly, the call server 18 (through the switching fabric 16) controls the connection of specific lines to specific trunks across through the use of fabric control messages 32 that specify the making and breaking of connections between subscriber terminals 12.

While most calls in narrowband systems are two-way, it is helpful to introduce, at this time, the nomenclature associated with one-way connections, namely the connection (TA, TB) refers to the one-way connection from terminal TA to terminal TB while (TB, TA) refers to a complementary (or independent supported) connection in the reverse direction.

Turning now to FIG. 2, there is shown a block diagram illustrating an underlying principle for subscriber terminal interconnection between narrowband and broadband networks. In this figure, a broadband network is used to transport the user and/or control information. To facilitate an understanding of the architectural differences between the conventional narrowband network of FIG. 1 and the broadband network adjunct that interconnects narrowband networks, common infrastructure is labelled with identical reference numerals.

At a first node 40, a number of subscriber terminals, such as landline telephones or modems (not shown for the sake of clarity), are coupled, typically, to a plurality of line interfaces 14–15 (although only one need be supplied for an operational system) of a narrowband system. The plurality of line interfaces 14–15 are each connected to a switching fabric 16 that is arranged to route an input of the switching fabric 16 to an appropriate output thereof. The plurality of line interfaces 14–15 are also coupled (usually on an individual basis) to a call server 18 arranged to administer and control, for example, the set-up and tear-down of calls across the narrowband network. The call server is coupled to a memory that is arranged to store, amongst other things, circuit indicators codes (CICs) associated with both real trunks and "phantom trunks"; the purpose of the latter will be described subsequently. More particularly, the memory can record a "busy" or "vacant" status against each of these real or phantom trunks.

The call server 18 is further coupled to a connection broker 44, which in turn is coupled to the switching fabric 18 via bus 45. The connection broker 44 represents a first departure in the system architecture from that of the conventional narrowband network FIG. 1. A trunk signalling interface 20, arranged to act to decode and interpret signalling schemes used within the narrowband network, is coupled between the call server 18 and the switching fabric 16. Outputs from the switching fabric 16 are coupled to a plurality of trunk interfaces 22–24, (although only one need be supplied for an operational system. The plurality of trunk interfaces are again coupled to secondary exchanges (not shown for the sake of clarity), such as PBXs or BSSs, within the narrowband network.

The switching fabric 16 is further coupled to a first trunk network adaptor 46 that allows interconnection and interoperability of the narrowband network with a broadband network 48 implemented, for example, for asynchronous transmission mode (ATM) operation. More particularly, interconnection of the trunk network adaptor 46 is through a broadband network edge switch 50, that is coupled to and hence controlled by the connection broker 44 by control lines (or buses) 51. The combined function of the trunk network adaptor 46 and the broadband network edge switch 50 will be described subsequently. Other narrowband networks 52–54 are coupled, in a similar fashion, to the broadband network 48 via respective trunk network adaptors 56–58 and broadband network edge switches 60–62. As will be appreciated, other narrowband networks 52–54 will be realised through infrastructure architectures similar to that described immediately above.

The broadband network 48 is further coupled to a second node 64, typically a different network, which is also responsive to the connection broker 44 via connection (or control line or control bus) 65. The second node 64 is also arranged to be in communication with the trunk signalling interface 20 via communications bus 67. Additionally, as will be understood, the broadband network may support point-to-point broadband communications, such as video telephony between subscriber terminals (not shown).

As will be appreciated, the terms node and exchange are interchangeable and are used to describe stand-alone systems, e.g. distinct narrowband networks operated by different operators.

Narrowband signalling within the communication system, generally, is controlled by the call server 18, while broadband signalling, i.e. signalling that may be sent between different narrowband networks 52–54 via the intermediate broadband network 48, is controlled by the connection broker 44. Consequently, the call server 18 need not be concerned with broadband signalling interconnection and operation.

The narrowband line interfaces 14–15, trunk interfaces 22–24 and switching fabric 16 are supplemented by a broadband network 48 and trunk (i.e. narrowband-broadband) network adaptors 46, 56–58 that act to provide gateway functionality. Specifically, the trunk network adaptors 46, 56–58 perform traffic (user information) interworking functions and signalling (control information) encapsulation, with the signalling ultimately relayed back to a call server 18.

The function performed by the connection broker 44 is used to provide a uniform connection abstraction 66 for the call server 18, independent of whether the connection crosses (and is retained entirely within) the narrowband network or the broadband network, or in the case where the connection crosses both the narrowband and broadband networks. This necessitates use of a uniform terminal name space identity (i.e. a standardised address format) for all terminals across the entire communication system, i.e. both narrowband and broadband systems.

For a narrowband to narrowband connection in a single narrowband network (e.g. owned by a particular operator), the connection broker 44 passes the connection messages to the switching fabric 16 (via connection 45), and therefore acts transparently in order to appear identical in function to the prior art narrowband network of FIG. 1. The switching fabric 16 of the narrowband network then establishes the connection in accordance with known techniques, and does not utilise the broadband network 48. For a broadband to broadband connection, the connection broker 44 instructs the broadband network 48 and/or edge switches 50, 60, 62 to make or break a call connection, and therefore mimics standard broadband operation.

For a narrowband to broadband connection, however, both actions must be performed contemporaneously. Specifically, the connection broker 44 both instructs the switching fabric 16, through the call server 18 in the narrowband network, to hold open a routing path for a call and negotiates with a trunk network adaptor 46 and edge switch 50 of the broadband network for the allocation of a suitable channel resource. Once both paths have been determined, the connection broker 44 sends dedicated messages to the switching fabric 16 and the trunk network adaptor 46 to establish the connection. This achieves the connection abstraction as seen by the call server.

In an operational communication system, compatibility between operators is desirable, if not essential. As such, establishing an interconnection (usually termed a "gateway"), between different "mixed nodes" is a significant issue. In this context, the term "mixed nodes" is used to describe different networks, operated by different operators, each typically having switchable narrowband-broadband capabilities and defined service capabilities. However, intermediate broadband networks may not be able to support these services (or any service of similar nature) nor be able to interpret narrowband control channel signalling required to set-up defined narrowband services, i.e. there are different signalling protocols between the different adjacent exchanges. In this case, the interconnection of the narrowband networks (through the intermediate broadband network 48) requires the functional co-ordination of separate call servers and connection brokers located in the respective networks.

Figure 3:
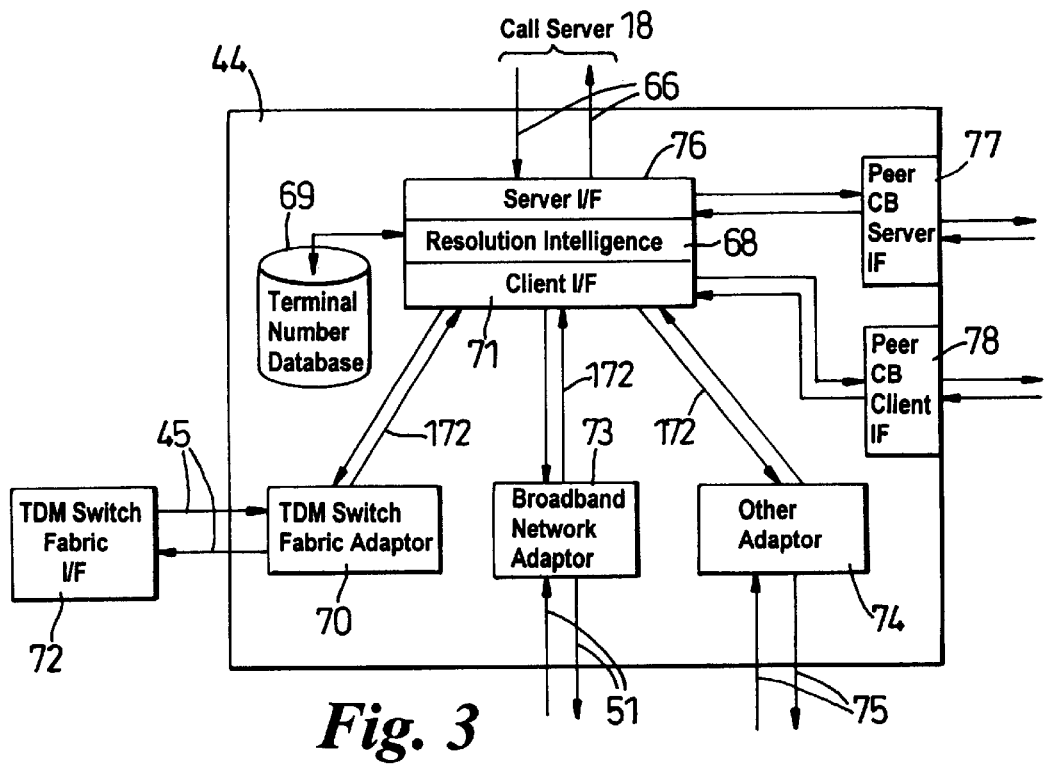
FIG. 3 illustrates an abstract architecture for a connection broker of FIG. 2.

Turning to FIG. 3, an abstract architecture for the connection broker 44 of FIG. 2 is shown. Although a hardware implementation is dependent upon (and hence determined by) specific requirements, a typical implementation extends the capabilities of an existing, narrowband telephone exchange. By way of example and explanation only, the connection broker 44 of FIG. 3 contains resolution intelligence 68 that is typically realised by a control processor. The function of the resolution intelligence 68 will be described subsequently. A terminal number data base 69 that maps the uniform terminal numbers onto network-specific location addresses is coupled to the resolution intelligence 68. A time division multiplexed (TDM) switch fabric adaptor 70 (in the case of a TDM narrowband system) provides protocol conversion between the resolution intelligence 68 (via a client orientated interface port 71) and a TDM switching fabric interface 72 (analogous to the switching fabric 16 of FIG. 2). Typically, a dedicated connection protocol 172 is utilised between the resolution intelligence 68 and the TDM switching fabric adaptor 70, although this need not be the case. A broadband network adaptor 73 is also coupled through the client interface port 71 to the resolution intelligence 68, with communication between the resolution intelligence 68 and broadband network adaptor 73 typically based on the dedicated connection protocol 172. The broadband network adaptor is analogous to the. trunk network adaptor 46 of FIG. 2. Other adaptors 74 for ancillary networks or services may also be coupled to the resolution intelligence 68 via the client interface 71. The broadband network adaptor 73 and the other adaptors 74 will accordingly be respectively coupled to the broadband network edge switch 50 via control lines 51 or appropriate communication resources 75. The resolution intelligence is also coupled to a server interface port 76 that provides an interconnection facility, via lines 66, to call server 18. The server interface port is also coupled through a secondary port 77 (termed a "peer connection broker server interface") arranged to interconnect the resolution intelligence 68 of the connection broker 44 to another connection broker (shown in FIG. 4). Similarly, the client interface port 71 is also coupled to a ternary port 78 (termed a peer connection broker client interface") arranged to couple the resolution intelligence 68 of the connection broker 44 to a subscriber terminal principally connected to another connection broker (as shown in FIG. 4).

Prior art telephone exchanges typically have a distributed processing architecture with multiple fault-tolerant processors and an inter-processor communications facility, while the switching fabric may be supported by a special purpose processor, as will be understood.

The connection broker 44 of FIG. 3 supports a set of real-time processes within a single fault tolerant processor, i.e. within the resolution intelligence 68. The inter-processor communications facility (supported by the dedicated connection protocols 172) of the connection broker is used to communicate with the switching fabric 16 and the call server 18. As has been previously described, the connection broker 44 typically incorporates broadband interfaces to enable control of the broadband network, although the connection broker may use the inter-processor communications facility to access the broadband interfaces on the trunk network adaptors. However, as communication networks evolve to be more broadband-orientated, the call server 18 and connection broker 44 may reside on processors with only broadband interfaces that are connected directly to the broadband network 48. The narrowband connection fabric would then be provided with a broadband control interface.

Figure 4:
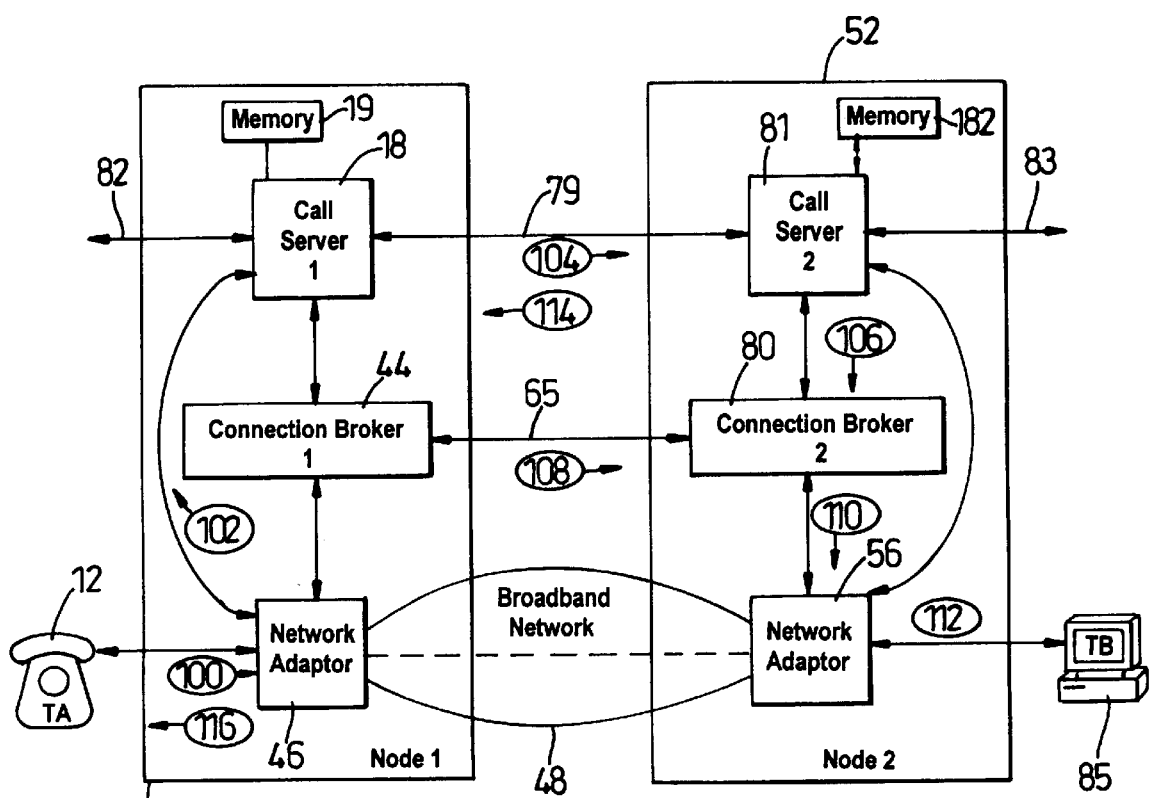
FIG. 4 is a representation of a system architecture and associated mechanism by which subscriber terminals can be connected across an intermediate broadband network.

A system architecture and associated mechanism for connecting subscriber terminals across an intermediate broadband network is shown in FIG. 4. In order for a data call, for example, to be supported between terminal TA (e.g. a land line telephone identified by reference numeral 12) on a first node 40 and terminal TB (e.g. a modem within a computer, identified by reference numeral 85) on second node 52, an existing common signalling relation between both narrowband nodes is utilised. It is the establishment of a common narrowband signalling link (or resource) 79 and protocol that provides interconnection across the system since the broadband network need only have the capability of relaying traffic between the narrowband networks. The broadband network consequently appears as a transparent channel resource since no modification of the narrowband traffic is required.

The first node 40 and the second node 52 both contain trunk network adaptors 46 and 56, connection brokers 44 and 80, and call servers 18 and 81 which are coupled permanently together over the common narrowband signalling link 79 that provides a plurality of virtual (or "phantom") traffic trunks. The call servers 18 and 81 are therefore potentially connected to other call servers (not shown) of different narrowband networks (not shown) by additional signalling resources 82–83. The call servers 18 and 81 are respectively coupled to connection brokers 44 and 80 that in turn are coupled to respective trunk network adaptors 46 and 56. The trunk network adaptors 46 and 56 are coupled together through a broadband network 48, while the connection brokers 44 and 80 are interconnected by a virtual link 84. Terminal TA 12 is coupled to trunk network adaptor 46, while terminal TB 85 is coupled to trunk network adaptor 56 (which, as is expressly shown in FIG. 3, is typically realised as an integral part within the physically separate second node 52).

The signalling link 79 is realised by a permanent connection between the two call servers 18 and 81, although this connection may be dynamically assigned or provided by a radio frequency link. Indeed, in a scenario where the first node 40 and second node 52 pre-exist as narrowband gateway nodes between network A and network B, real narrowband E1 trunks already exist between these two exchanges and, as such, signalling can be carried in a time-slot of these E1 trunks, i.e. conventionally in time-slot sixteen. Alternatively, in a North American-based system, the two different exchanges could be connected to a common STP network. Once the broadband network 48 is in place, however, supplementary signalling bandwidth can be supported by establishing links through the broadband network. Nonetheless, these multiple paths represent a single logical "signalling relation" by which SS7 user parts (i.e. the call servers) are able to communicate and interact.

The virtual link 84 established between the two connection brokers 44 and 80 offers a permanent "ability to communicate". The virtual link 84 therefore takes the form of an ATM virtual channel connection (VCC). However, it is also possible for an SS7 network to be used as the bearer for this communication, e.g. in relation to a TCAP application. The communication links between the connection brokers 44 and 80 and both the network adaptors 46, 56 and the switching fabrics are also permanent, while connections that carry traffic between the network adaptors 46, 56 and the interconnected subscriber terminals TA 12, 85 are made and broken for the duration of a specific call or for particular portions of those calls.

This system operates by virtue of the provision of at least two (and probably tens to thousands of) assignable signalling channel resources or "phantom trunks" between the respective switching fabrics, principally residing between the respective call servers 18 and 81 and respective connection brokers 44 and 80. The nodes then utilise narrowband signalling to simulate the presence of virtual (or "phantom") terminals at either node. These phantom trunks are dedicated to a single node and, as such, the system only allows the formation of a call in one direction from the first node 40 to the second node 52 or vice versa. Thus, a phantom route between the two nodes consists of two groups of phantom trunks, one in each direction. By this mechanism, undesirable effects which could otherwise occur if the same phantom trunk was seized by each node trunk are prevented. Beneficially, the phantom trunks do not tie up real communication resources that exist between the respective narrowband networks.

In relation to the structure, content and function of call set-up messages between different exchanges (i.e. different nodes), this can best be understood with reference to FIG. 4 (and the following description) that illustrates the procedural steps required to establish a multi-node communication across a broadband network.

An incoming call (or "initial address message", IAM) from terminal TA is received at the first node 40, whose call server 18 receives the incoming message and determines that the call must be routed to the second node 52. The incoming call will at least contain a CIC relating to the trunk assigned between TA and the call server 18 together with a telephone number of the called party, namely TB in this example. The telephone number does not otherwise provide any indication of a port address to be used by TB in any subsequent communication and therefore principally acts to provide a routing instruction for use by the call servers. As such, the telephone number merely represents an address location of TB, although it may need to be subsequently transposed in order to arrive at a valid cross-node address.

In response to receipt of the incoming call and to save real communication resources (i.e. real communication links that can support 64 kbps speech, for example), the first call server 18 selects a free phantom terminal PTx and then uses this phantom terminal to establish a phantom trunk between itself and a second call server 81 located in second node 52. Indeed, the call server 18 selects an available, node-unique ("disjoint") address field indicative of the free phantom terminal PTx from its associated memory 19. The free phantom terminal PTx, in fact, identifies a terminating address of the phantom trunk.

Typically, a phantom terminal identity is comprised from point codes associated with the two call servers 18, 81 and the CIC of the phantom trunk. In this instance, ordering of the point codes of the two call servers will identify a relative direction for the communication.

The first call server 18 then utilises the phantom trunk to relay a modified call message (to the second call server 81 of the second node 52) comprised from a CIC associated with the phantom trunk together with the valid telephone number of TB. The second call server 81 is therefore able to utilise the telephone number of TB to "wake-up" or alert TB to the fact that there is something in the communication system that will be of interest to TB, albeit that TB is yet to receive any meaningful information. In should be noted that, at this time, the CIC pertaining to the connection between TA and the first call server 18 has been "lost" to the second node 52 since it is neither communicated nor encoded within the modified call message. In other words, the call server 18 of the first node 40 notifies the call server 81 of the second node 52 about the incoming call 100 by sending 104 a modified incoming call message on a phantom trunk, and thus passes on the dialled digits (i.e. the address of the called party) received from TA.

Furthermore, in response to the incoming call 100, the connection broker 44 of the first node 40 is arranged to establish a phantom cross-office path between PTx and TA, with information pertaining to this cross-office path typically stored in the terminal number data base 69 by the resolution intelligence 68. In other words, terminal TA is coupled to phantom terminal PTx. Also, the first connection broker 44 is triggered into action by the communication of the modified call message (to the second call server 81). Specifically, substantially contemporaneously with the sending of the modified call message, the first connection broker 44 of the first node 40 notes that the phantom terminal PTx is one end of an outgoing phantom trunk to the second node 52. The first connection broker therefore passes a connection request 108 to the second connection broker 80 via virtual link 84; which connection request contains the CIC of the phantom trunk and the identity of TA (possibly derived from the original CIC assigned to the trunk between TA and the first call server 18). Typically, the actual address of the call-originating unit, i.e. TA, is sent.

The second node 52 reacts to the modified incoming call message (received on the phantom trunk) by mapping the received circuit indicator code (CIC) of the phantom trunk onto an associated second phantom terminal PTy. Again, the second phantom terminal PTy has been selected by the second call server 81 of the second node 52 from its associated memory 182, with the memory up-dated to record that PTy represents a terminating point of the phantom trunk. Selection of the phantom terminal PTy is on a unique basis.

The second node 52, in response to the second call server 81 receiving the modified incoming call message, already appreciates that the destination of the incoming call ultimately lies with terminal TB. Therefore, at an appropriate time, the second call server 81 requests a connection from TB to the second phantom terminal PTy (in the form of a second phantom cross-office path request between the phantom trunk and the called subscriber TB), and offers the incoming call request to TB using conventional signalling.

Furthermore, the resolution intelligence of the second connection broker 80, in response to receiving (in any order) both requests resolves out the two phantom terminals PTx and PTy, converting the two requests "Connect TA to PTx" and "Connect TB to PTy" into the single real connection request "Connect TA to TB". Specifically, the second connection broker 80 is able to deduce the fact that there is a common CIC for the phantom trunk, and so the requirement for a direct connection between TA and TB is identified by virtue of this commonality. The second connection broker 80 then makes an actual trunk connection between TA and TB via the second trunk network adaptor 56. At about the same time, the second connection broker 80 (of the second node 52) instructs the first connection broker 44 (of the first node 40) that the path to TB is in place.

Acceptance by the terminal TB of the call, and confirmation of the connection by the second call broker 80 is notified from the second call server 81 to the first call server 18, and the first connection broker 44 also notifies 116 its associated call server 18 that the path to TB is in place. At this point, the first call server 18 may start billing the call.

The phantom trunk remains intact for the whole duration of the call, with tear-down of the broadband connection operating in a complementary sense to the call set-up procedure describes in detail above. The skilled addressee will appreciate that to clear-down a broadband call, the call servers may clear a call using standard procedures for a narrowband (or SS-7) communication, as will readily be appreciated. Particularly, as part of this procedure, both call servers will issue requests to their respective connection brokers. Thereafter, the connection broker at the outgoing end of the phantom trunk will pass its release request onto the other connection broker by sending the CIC of the phantom trunk. The terminating connection broker will issue a clear-down of the broadband connection on receipt of whichever of the two messages it receives first. It is noted that the phantom trunk is not re-useable until both call servers have been told (by their respective connection brokers) that the broadband connection has cleared.

As will be understood, an exemplary address format for each phantom terminal is typically arranged to be a special case of the format used for real (i.e. physical rather than imaginary) terminals. An ASN.1 Object Identifier can be used to identify phantom trunks. Alternatively, a partitioned E.164 address or a superset of E.164 may be utilised, while for a simple SS7-based implementation the tuple (OPC, DPC, CIC) can uniquely identify a trunk (whether real or phantom). However, as will be appreciated, another scheme is needed for non-SS7 terminals, such as telephones. For example, the CIC field could be extended to 32 bits (rather than the normal 16 bits) and DPC can then be equated to OPC to identify a "line" type of a terminal while the CIC can be used to identify the line on the exchange. Generally, however, the only requirement for establishing a phantom trunk is for the connection broker to appropriately tag and record (in the terminal number data base 69) such a phantom trunk as either incoming or outgoing.

Turning again to the general architecture of FIG. 2, an ATM network and the International Telecommunications Union Telecommunications Section (ITU-T) signalling system No. 7 can be utilised to implement the broadband network and-narrowband control signalling, respectively.

Particularly, a narrowband node utilises the ISDN User Part (ISUP) of ITU-T signalling system no. 7 to communicate with other exchanges (e.g. narrowband network 52) to support multi-node operation. The exchange terminates some narrowband lines directly and terminates narrowband trunks via trunk network adaptor 46 connected to an Asynchronous Transfer Mode (ATM) network 48. The trunk network adaptor 46 translates bearer channels to an ATM scheme, with a one-to-one relationship existing between each bearer channel and an ATM virtual channel (VC). Typically, the broadband network edge switches 50, 60–62 and hence the trunk network adaptors 46, 56–58 are connected to the ATM network 48 using ATM Forum User to Network Interface (UNI) version 4.0 interfaces for the traffic bearer channels and the control lines 51, while the connection brokers establish Q.2931 connections 51 to trunk network adaptors 46, 56–58 using the proxy signalling option of UNI 4.0.

Narrowband signalling to other exchanges can use either existing narrowband connections or can be routed via network adaptors (e.g. 46, 58) and the broadband network using either circuit emulation or frame forwarding. The concept is applicable to both fully and quasi-associated signalling schemes. Connections to another mixed mode node are implemented in a similar fashion.

As will now be understood, the connection broker 44 passes narrowband-to-narrowband requests to the narrowband switching fabric 16, while broadband-to-broadband connections (within the same node) are established using proxy signalling to set-up the connection directly. For narrowband-to-broadband connections, two requests are needed; one to the narrowband switching fabric 16 and one to the broadband network edge switches 50, 60–62. However, for a broadband-to-phantom terminal connection, the connection broker passes the connection request to the second connection broker (reference numeral 70 of FIG. 3) at the other end of the phantom route. The connection is then made by using a proxy signalling scheme emanating from the second connection broker 70. It should be noted that phantom terminals can be implemented (or realised) as broadband terminals, and so a narrowband-to-phantom terminal connection is handled as a combination of a narrowband-to-broadband connection and a broadband-to-phantom terminal connection.

It will also be appreciated that the service inter-working function is also applicable to networks that have intermediately coupled broadband networks. In this instance, the interconnection between call servers can provide gateway functions, such as billing and screening, while the connection brokers permit end-to-end connections between the narrowband terminals. Similarly, signalling inter-working functions not otherwise available to respective narrowband networks can be provided by connecting call servers together via the phantom trunks.

In summary, the second connection broker recognises two connection requests have been received to the opposite ends of the same phantom trunk, and in response thereto establishes a direct route through the broadband network between the first subscriber terminal 12 and the second subscriber terminal 68.

The connection mechanism outlined above therefore provides for the interconnection of mixed nodes through an intermediate broadband network which is otherwise unable to interpret and therefore unable to support the control channel signalling protocols separately utilised within the narrowband networks. Such operation could be supported, for example, by a modified trunk network adaptor (of a broadband network) equipped with narrowband signalling software, but generally occurs between different infrastructure exchanges. Consequently, by employing this mechanism to establish a common control channel, the modified trunk network adaptor can support a narrowband traffic resource to participate in narrowband services without requiring the intervention of a signalling inter-working function.

Beneficially, the combination of phantom trunks and the connection broker architecture results in a system implementation that requires no modifications to present narrowband signalling schemes and which supports all narrowband services. Additionally, only minimal changes are required to existing narrowband call servers. Indeed, this system is scaleable to arbitrarily complex networks and which can operate over any underlying connection fabric including TDM, ATM or Frame Relay.

The basic architecture shown in FIGS. 2 to 4 illustrates the configuration (and describes the function) of the principal equipment that utilises the novel and inventive concept of phantom trunks to establish effectively a connection between narrowband trunks and virtual channels of a broadband network.

While the use of phantom trunks is an extremely effective and inventive mechanism for establishing a connection (at a network level) between narrowband trunks and virtual channels of a broadband network in the face of dissimilar signalling schemes, the mechanism of interconnection is relatively slow inasmuch as the present demands of the UNI require several control signals to be sent and received before an end-to-end connection can be successfully provisioned.

The present invention has identified that the system (and particularly the narrowband-broadband interface) can be partitioned differently to accepted, conventional configurations, which structural alteration advantageously lends itself to a functional partitioning that eliminates component and task duplication and which, beneficially, further eliminates the requirement to provide certain control signalling overhead. Consequently, the system of the preferred embodiment of the present invention provides a more efficient and faster mechanism for establishing connection between narrowband trunk circuits and broadband virtual channels.

Figure 5:
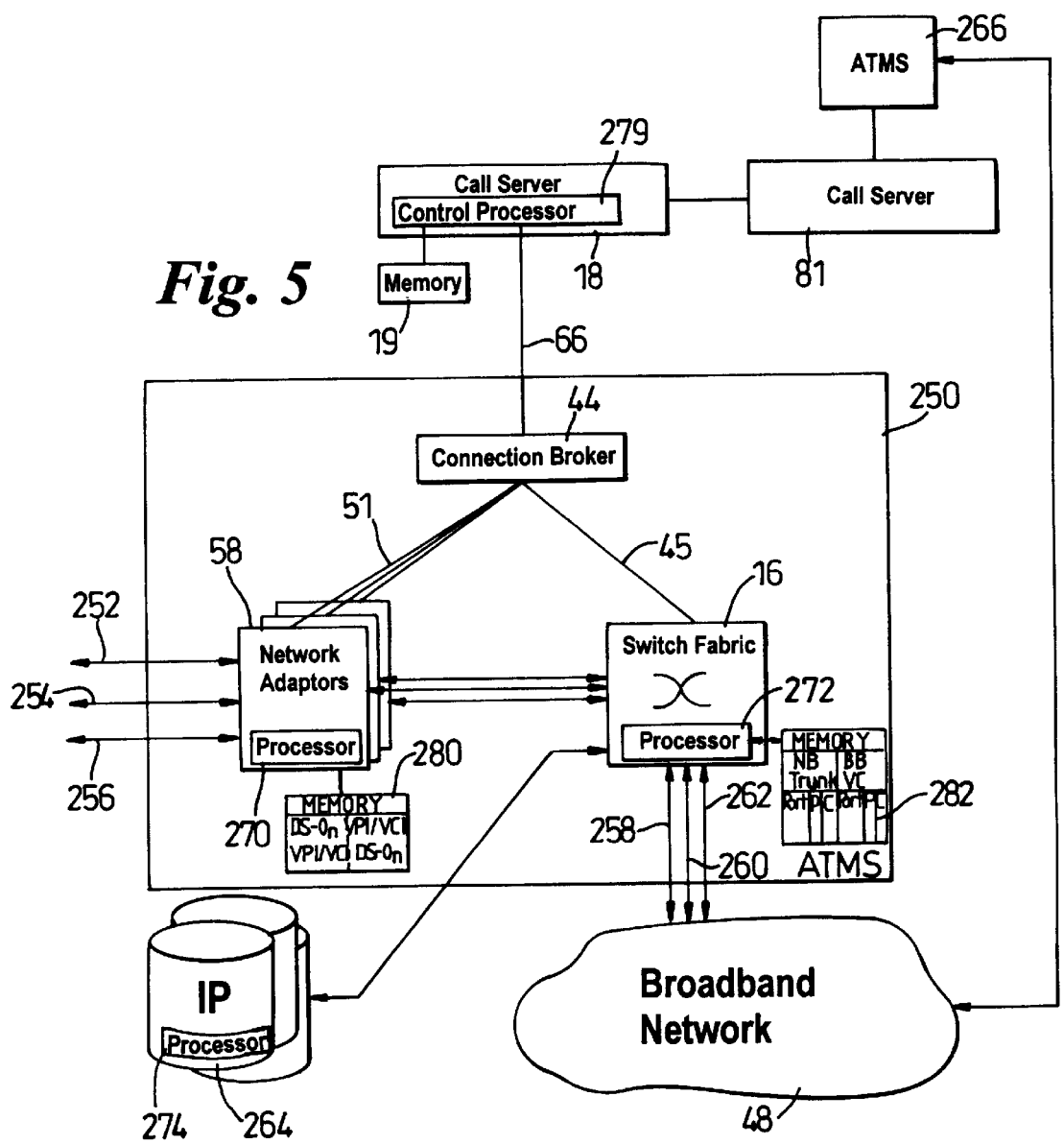
FIG. 5 is a basic block diagram of a communication system architecture suitably configured to support a preferred embodiment of the present invention.

Turning attention to FIG. 5, a basic block diagram of a communication system architecture according to a preferred embodiment of the present invention is shown. A first call server 18, responsible for overall system control (as previously described), is coupled to a first narrowband-broadband interface (termed an ATMS, or ATM system 250) which contains a connection broker 44 and associated memory. More especially, the first call server 18 is coupled to the connection broker 44 through a fabric application interface (FAI) 66. The connection broker 44 is coupled to both a plurality of network adaptors 58 (that interface to a plurality of narrowband trunk circuits 252–256) and to a switch fabric 16 through control bus 45. The switch fabric is coupled into a broadband network 48 through a multiplicity of virtual channels 258–262. The plurality of network adaptors 58 may also be logically coupled to at least one intelligent peripheral 264 that may be realised as an Internet server or other data repository, with the intelligent peripheral physically coupled to the switch fabric 16. Consequently, the ATMS 250 (overseen by the connection broker 44) may route incoming traffic directly to the intelligent peripheral 264 and then loop-back requested data or information to the request-originating unit. As such, the request-originating unit may only make use of narrowband trunk circuits or broadband virtual channels at a particular time, but not necessarily both simultaneously. The first call server 18 will also typically be coupled to a second call server 81, which second call server 81 will in turn be coupled to a second ATMS 266. The second ATMS 266 is then coupled to a broadband network, such as broadband network 48.

An interworking function therefore exists across the interface and specifically between the network adaptor 58 and the (broadband) switch fabric 16. Generally, the connection broker 44, each network adaptor 58, the switch fabric 16 and the intelligent peripheral 264 each contain control processors (270–274) that principally function to control the routing of data. Indeed, in a software-driven environment, these control processors operate to open and close circuit and channel connections, and conduct general housekeeping and maintenance tasks (including the generation of status reports and system integrity tests). A control processor 279 of the call server 18 generally oversees the operation of the ATMS 250, including control functions associated with the set-up and tear-down of calls. The control processor 279 therefore has access to the associated memory 19, as will readily be appreciated.

In relation to exemplary network adapter 58, control processor 270 is further coupled to memory 280 (either on-chip, cache or realised by a discrete database) that stores mapping (or cross-reference) information associated with the provision of paths through the network adapter 58. More particularly, the mapping information relates, on a pre-provisioned basis, narrowband trunks (incident to the network adapter 58) to assigned VPI/VCIs and, in a complementary sense, VPI/VCIs (incident to the network adapter 58) to narrowband trunks (or DS-Os). Preferably, the mapping function provides a unitary (one-to-one) mapping function between the narrowband trunks and virtual channels.

The switch fabric 16 allocated by the broadband network and the pre-provisioned virtual channels of the network adapter 58 further includes a memory 282 accessible by processor 272, which memory 282 also contains cross-connect information across the switch fabric 16. In the preferred embodiment, the cross-connect relationship in memory 282 is dynamic, with the memory basically configured from a data base that relates port identities, VPIs and VCIs in the context of both incident narrowband trunk circuits and broadband VCCs. The switch mapping function will readily be appreciated by the skilled person since it is entirely consistent with the prior art technique of recording a map function during call establishment and real-time channel resource allocation.

The control processor 272 of the switch fabric is typically realised by an embedded processor, but a distributed processing platform may cause this control logic and circuitry to be located elsewhere within a fabric control system tasked with overseeing the operation of the ATMS.

In contrast with the prior art architectures that must utilise the UNI to determine and identify (by interrogation and negotiation with the broadband network 48 that includes the switch fabric and associated control software) a VPI/VCI assigned for the call (and then to record the connection in memory), the present invention can connect a narrowband trunk to a pre-provisioned network virtual channel (VC) by using the stored VPI/VCI information of the two end points to establish a cross-connect. Alternatively, if the network VCC is established on demand, the cross-connection can be established immediately once the VPI/VCI of the demand assigned channel is known.

In the case of demand assigned VCCs, there is an advantage in initiating the VCC as early as possible in the call to minimise post-dial delay. In contrast with a phantom trunk scheme which cannot resolve both end addresses until the terminating call server has selected the final end point, the present scheme uses a generic end point for the terminating call server's switch (end point) domain and can therefore select or create the virtual channel connections used for the inter-node trunk immediately. This is by virtue of the fact that the call server associated with the initiating side of the call knows the ATM address of the cross-connect of the call server associated with the end-point, i.e. the call server associated with the dialled party. In fact, the switch fabric 16 does not therefore need to execute any external signalling and, as such, the present invention represents a regime that is substantially simplified with respect to the prior art allocation mechanism.

In relation to the pre-provisioning of VPI/VCI to trunks and vice versa, this pre-provisioning can occur at any time prior to the call establishment procedure needing to be actioned. For example, pre-provisioned could occur at system installation or may be varied dynamically within the system to accommodate the release of additional communication resources. In other words, pre-provisioning removes both the necessity for negotiation during call establishment and also eliminates connection delay usually arising from having to access and implement protocol stacks, as will be appreciated. Indeed, by providing pre-assigned VPI/VCI to narrowband trunks and vice versa, processing speed of connection requests is increased and the requirement for UNI call processing signalling (e.g. the use of Q.2931) between the network adaptor 58 and the switch fabric can be eliminated altogether. In this way, the interface between the narrowband and broadband networks is merely located between the switch fabric 16 and the broadband network 48, rather than on both sides of the switch fabric 16.

As will be appreciated, the pre-provisioning scheme of the present invention eliminates substantial call processing functions (within the network adaptor 58 and switch fabric 16) associated with: a) Q.2931 signalling; b) usage parameter control (i.e. signal policing); c) call admission control (e.g. the statistical evaluation of the system capacity); and d) traffic shaping function (i.e. the monitoring of operational compliance by the network, generally). Indeed, in relation to traffic shaping, use of the present invention avoids determinations relating to ATM contract/format compliance (such as an acceptable statistical variation with respect to constant bit rate traffic) because pre-provisioning grooms all communication paths to be of certain known types.

The processor 270 of the network adaptor can therefore be simplified by restricting its performance to, principally, voice processing features, such as echo cancellation and through-path control, while the switch fabric 16 performs space switching, namely scaling and connectivity functions between narrowband node and broadband network.

By providing the pre-provisioning solely in the direction from narrowband trunks to the VPI/VCIs, the system (and particularly the interface) of a first aspect of the present invention provides "switched virtual channels" (or SVCs). The concept of the present invention can, however, be extended further to enhance system operation to 'permanent (or semi-permanent, PVC) virtual channels' and 'cached SVCs' by applying pre-provisioning to eliminate signalling, such as Q.2931, between the switch fabric 16 and the broadband network 48. In this way, the interface and narrowband/broadband network become fully meshed such that voice and data routes through the switch fabric 16 (and interface, generally) are, preferably, always pre-provisioned and in sufficient number to support the largest community at any particular node in the network. In other words, and unlike conventional negotiation and assignment of VCCs, VPI/VCIs are also pre-provisioned such that a dedicated and unique route exists from narrowband trunk to broadband connection, with the switch fabric 16 merely having to execute a hunt for a free (available) VPI/VCI within its associated memory.

Since PVCs are virtual channel connections (VCCs) pre-provisioned on an end-to-end basis, VCCs can exist simultaneously to all nodes in the system, i.e. virtual (potential) connections to all broadband channel resources can be simultaneously supported by the actual and limited amount of bandwidth available to the system as a whole. More particularly, it has been realised that the configuration of VCCs is independent of them carrying any traffic (because each end-to-end connection only exists in a virtual, tabulated form (in the memory 280) rather than in an tangible, bandwidth-using form of a circuit-switched network, for example). Therefore, so long as there are no ATM cells being transmitted over the VCCs, a fully connected and inter-meshed network of routes is available and the necessity for dynamic signalling (for connection control and administration) over these routes can hence be preferably eliminated, but at least minimised.

Clearly, in all cases, the processor 272 of the switch fabric 16 tags a VPI/VCI:DS-0 entry as "active" in the event that that particular route has been selected/identified for a particular call.

In summary, real-time UNI signalling associated with VCI/VPI allocation can be entirely eliminated but at least minimised (as appropriate) by the use of the pre-provisioning mechanism of the present invention. As such, the speed of call connectivity is increased and the complexity of the narrowband-broadband interface simplified. Moreover, pre-provisioning can be implemented on both sides of the switch fabric, or can be restricted directly to narrowband trunk connectivity. Indeed, use of the present invention to pre-provision routes produces an improved system architecture that has a new point of entry into the connection control system of conventional broadband switch fabrics. In fact, the new point of entry entirely by-passes the necessity for traffic management in call processing, which traffic management would otherwise require a separate and dedicated application interface (API) and associated signalling scheme, such as Q.2931. To reiterate the reason for the omission of the traffic management function, the pre-provisioning of paths of the present invention removes the necessity for the system to conduct statistical evaluation of VCC capacity within the broadband network.

Figure 6:
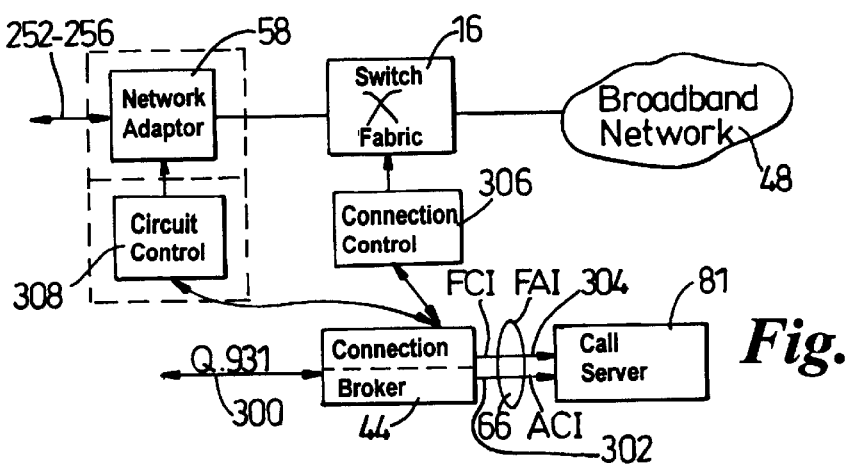
FIG. 6 illustrates a functional separation of concerns achieved by application of the pre-provisioning of routes in accordance with the preferred embodiment of the present invention and the architecture of FIG. 5.

By realising the pre-provisioning of routes of the preferred embodiment of the present invention, a system constructed to embody the present invention also benefits from an inherent ability to segregate concerns such that there is no duplication of functionality between structural elements within the ATMS; this is illustrated by the block diagram of FIG. 6. Narrowband access signalling 300, such as Q.931, is directed through the connection broker 44 to the call server 81 via access control interface (ACI) 302 of fabric application interface (FAI) 66. The call server 81, via fabric control interface (FCI) 304 of FAI 66, communicates separate and functionally distinct service logic, namely connection control logic 306 and circuit control logic 308, to the switch fabric 16 and the network adaptors, respectively. The connection control logic 306 is coupled to the switch fabric 16 and is arranged to control broadband connection, whereas circuit logic 308 is coupled to at least one network adaptor 58 for control of circuit-switched (narrowband) connections. The feature list realised in the circuit logic 308 can now be restricted to software (and associated hardware) required to support tone detection/generation, through-path enablement in relation to both bridge and cell-stream scenarios and signal processing functions, such as echo cancellation.

As will be understood, the location of the service logic, particularly the circuit logic 308, is unimportant and, as such, it could be collocated within the processor 270 of the network adaptor 58 or as a separate entity within the fabric control system (as indicated by the dotted box). In contrast to the arrangement of FIG. 6, a prior art system would need a call processing function associated with the switch fabric 16 to translate between narrowband Q.931 signalling and broadband (UNI-compliant) Q.2931 signalling (or the like) for use as a negotiating protocol in the ATM domain. The prior art system of FIG. 1, for example, would therefore suffer from the disadvantage of having to provide a duplication of ostensibly identical service logic to both the network adaptor and the switch fabric.

In relation to FIGS. 5 and 6, information transfer between the various system entities (particularly the switch fabric and the network adaptors) is typically supported by one of a number of ATM adaptation layer (ML) protocols, such as AAL-1 for 64 kbps services or AAL-2 for compressed voice. However, any suitable broadband communication technology could be used. As will be appreciated, therefore, a suitable broadband bus interconnects the various system entities. Furthermore, while the present invention basically describes a system in which a connection broker has a connection map, the network adaptor 58 has a pre-provisioned connection memory and the switch fabric 16 has a connection memory that is dynamically configurable at a port level, it is contemplated that the reverse scenario could also be implemented, i.e. a static connection memory in the switch fabric and a dynamic memory in the network adaptor.

To map a CIC at call establishment time onto the same VCC at both ends the present invention preferably utilises a scheme that sends the CIC forward via SS7/ISUP signalling of the connection broker, with a rendezvous established at the receiving connection broker; this is also applicable in an SVC environment. Generally, the underlying mechanism of the preferred embodiment is applicable to four regimes, namely virtual paths (VP), SVCs (in the context of both pre-provisioned and demand assigned) and PVCs. In the case of VPs (virtual paths), the preferred embodiment sets the CIC as the VCI, although other simple modifications are possible. Indeed, in an SVC scenario, it may be preferable to utilise VCCIs.

FIG. 7 illustrates a flow diagram of the pre-provisioning mechanism of the preferred embodiment of the present invention. Initially, at 400, service logic is appropriately partitioned between network adaptors and a switch fabric. In relation to the network adaptors, a first connection map is generated 402 that associates narrowband trunks and virtual circuit identities. Alternatively (or additionally 404), a second connection map is generated 406 (for the switch fabric), which second connection map associates port addresses of narrowband trunks with port addresses of broadband channel resources. Following the pre-provisioning of at least one through path connection at the network adaptor interface or the broadband interface, the connection broker is then in a position to receive 408 a connection instruction from a call server via the FCI of the FAI. The connection broker can then route 410 the connection request to the entity containing the appropriate service logic/hardware. By accessing the memory a hunt can be conducted to identify 412 an available through path in the first and/or second memories. Once a through path has been identified the path is opened 414. Optionally, the system can dynamically vary pre-provisioning within the connection maps associated with the network adaptors and/or switch fabric, subject to additional resources/ports becoming available (416).

For the sake of completeness, operation of the system will now be described in relation to its principal components. The call server 18 controls the operation of a narrowband-broadband interface (ATMS) through the fabric application interface (FAI), which FAI preferably provides a simple and uniform view between the call server and the narrowband-broadband interface. The call server contains a control processor 297 that interacts with a memory 19 that serves to store system control algorithms, network addresses and information relating to communication connections and the operational status of the network, generally. The memory 19, although shown as a separate entity from the call server, may be located within the call server itself.

As will be appreciated, the ATMS 250 provides an interface for connecting narrowband trunks, typically supporting a time division multiplexed protocol (although other forms of multiplexing are also applicable), to virtual channels 258–262 used to relay information across a broadband network 48 (such as an ATM network). The ATMS supports many narrowband trunks 310 and contains many network adaptors. The switch fabric 16 acts to connect network adaptors 46 (and hence information or data incident to narrowband trunks) to virtual channels. The switch fabric 16 is further coupled to a network announcement server (not shown) that typically stores a plurality of pre-recorded system announcements that provide verbal instructions or verbal reassurance to narrowband or broadband users attempting to utilise the narrowband-broadband interface. For example, the network announcement server may store and relate the message "All connection in the network are presently busy, please try again later" when no virtual channel bandwidth or capacity is available for connection into the ATMS, or no trunk circuits are available for through-connection to the narrowband network.

The ATMS typically includes many connection brokers that are connected to the call server through the fabric application interface, although the ATMS must contain at least one connection broker for successful operation. More specifically, interconnection of the call server to the connection brokers is achieved through the fabric control interface (FCI) that can support and relay, amongst other things, virtual channel identities and system control messages. In more detail, the connection broker is responsible both for overseeing interactions between the ATMS and the call server concerning connections through the ATMS and for coordinating other fabric control modules to implement and satisfy call server instructions and requests. In other words, the call server, as previously indicated, is principally responsible for controlling the making and breaking of connections across the narrowband-broadband interface.

Fabric control modules that connect to the connection broker include a service circuit resource manager (not shown) that is responsible for managing a pool of network announcement servers that may need to be connected to traffic connections across the ATMS, as previously described. The service circuit resource manager is also coupled through the fabric application interface to the call server, which connection to the call server is through a dedicated announcement control interface (ACI).

A switch connection circuit (not shown), coupled between the connection broker and the switch fabric, is responsible for coupling and detaching virtual channels that terminate on the switch fabric 16. In other words, the switch connection is circuit controls through connection (i.e. circuit switching) of virtual channels to identified network adaptors 46.

Terminal process controllers (of which there are usually many within the ATMS) are positioned and connected between the connection broker and the plurality of network adaptors 46 within the ATMS. Each terminal process controller is responsible for managing the operation of synchronous circuits terminating on a network adaptor 46 in traffic connections across the ATMS, and hence serves an analogous purpose to the switch connection circuit but in relation to narrowband trunks (rather than virtual channels). The terminal processing controllers are also coupled to signalling processors (of which there are typically many within the ATMS), while the signalling processors are also coupled to the network adaptors 46. Each signalling processor is coupled to the call server through a signalling control interface (SCI) that forms part of the fabric application interface. The function of each signalling processor is to control the conversion of signalling information between FAI messages exchanged over the SCI between the call server and the framed structures and signalling formats used by the synchronous circuits that terminate on each network adaptor 46. In other words, each signalling processor acts to convert information bits at a network adaptor level to and from messages at a call server level. In this way, a unified view is provided by a fabric application interface by virtue of the use of standard signalling schemes on the FCI, the ACI and the SCI.

The system also includes a management agent having a control processor and associated memory. The associated memory may be located within the management agent. The management agent is also coupled to the call server through the fabric application interface (FAI). Specifically, a dedicated management virtual channel connection (VCC) provides interconnection of the call server to the management agent, with the management VCC also forming part of the fabric application interface. The management agent is also coupled to each of the terminal process controllers and each of the signalling processors through information buses, while the management agent is also able to communicate (over another information bus) with the connection broker.

The connection broker, the service circuit resource manage, the switch connection circuit, the terminal process controllers, the signalling processors and the management agent (and its associated processor and memory) together contain and constitute the distributed fabric control system (FCS). The FCS therefore also contains software programme blocks that control the functionality of the ATMS and its interconnection to the call server through the FAI. The signalling processors, the terminal process controllers, the switch connection circuit and the service circuit resource manager will therefore each typically require dedicated processors and memory (perhaps realised as an on-chip memory cache). The processors will control operation of the individual instances, and may be accessed (or interrogated) by the management agent 338 to access operational status, for example.

The fabric control system can have a distributed functionality, with the fabric control system comprising five principal functional modules and a management agent. It will, however, be appreciated that the distributed functionality provided by the functional modules may be co-located since the functionality is typically realised by controlled software located within system controllers or processors.

It will be understood that dedicated information buses may also be provided between the management agent and both the switch connection circuit and the service circuit resource manager, notwithstanding that the management agent is able to communicate with (and interrogate) these units through the connection broker. Additionally, such information buses may only be required for a distributed system in which the fabric control system is realised by discrete functional units.

In summary of the benefits and advantages gained from employing the present invention, the segregation of concerns (i.e. the separation of service logic between connection control and circuit control) allows the communication system to be more cheaply manufactured, while the pre-provisioning of routes through the switch fabric reduces processing complexity and connection time.

It will, of course, be appreciated that the above description has been given by way of example only and that modification in detail may be made within the scope of the present invention. For example, although described exclusively in relation to Q.2931 signalling, the concepts embodiment by the present invention are widely applicable to other forms of signalling within other types network. The concept of pre-provisioning of the preferred embodiments of the present invention generally and advantageously allows broadband cored narrowband service nodes to meet standards specified operating criteria of conventional prior art narrowband technologies, while also providing overall high performance for large scale systems.

Finally, for the sake of a complete but specific understanding in relation to a broadband UNI implementation of the present invention, a summary of the major acronyms is provided immediately below (although for a complete understanding reference should be made to the ITU-T technical specification I.113):

VCC—Virtual Channel Connection;
VPI—Virtual Path Identifier;
VCI—Virtual Channel Identifier;

What is claimed is:

1. A method of communicating information between narrowband circuits and broadband channel resources across an interface have a processor for controlling connection therebetween and an associated memory, the method comprising the steps of:
   pre-provisioning connection paths between narrowband circuits and broadband channel resources and storing these pre-provisioned connection paths in the memory as connection identifiers;
   in response to the interface receiving an instruction to connect narrowband circuits and broadband channel resources, having the processor establish a connection path using available pre-provisioned connection identifiers;
   pre-storing VPI/VCI information pertaining to end points of a cross-connect and establishing a connection between a narrowband trunk to a pre-provisioned network virtual channel connection (VCC) using the stored VPI/VCI information; and
   establishing a cross-connect to a virtual channel by first determining a VPI/VCI of a demand assigned channel connection.

2. The method of communicating information according to claim 1, wherein the connection identifiers associate port addresses of the interface to pre-provisioned connection paths.

3. The method of communicating information according top claim 1, wherein at least one call server administers the set-up of a call and the method further comprises the steps of:
   using a generic end point as a termination point of a switch responsive to a call server associated with a called party; and
   establishing a virtual channel connection for an inter-node trunk based on the generic end point.

4. The method of communicating information according to claim 3, wherein the step of using a generic end point further comprises the step of supplying a call server associated with a calling party with an ATM address of the cross-connect of the call server associated with the called party.

5. The method of communication according to claim 1, wherein a unitary mapping function is provided between narrowband circuits and broadband channel resources, which mapping function relates narrowband trunks to assigned VPI/VCIs and to narrowband trunks.

6. The method of communication according to claim 1, wherein pre-provisioning occurs at any time prior to actioning of a call establishment procedure.

7. The method of communication according to claim 1, wherein pre-provisioning occurs in a dynamically varying fashion in response to an availability of communication resources.

8. The method of communicating information according to claim 1, wherein the interface comprises a switch and a plurality of network adaptors, the method further comprising at least one of the steps of:

providing a first memory associated with the plurality of network adaptors and pre-provisioning and storing in the first memory a first connection map associating narrowband trunks and virtual channel identities; and providing a second memory associated with the switch and pre-provisioning and storing in the second memory a second connection map of port addresses of narrowband trunks and port addresses of broadband channel resources.

9. The method of communicating information according to claim 8, further comprising the step of having the processor hunt for an available VPI/VCI within its associated memory to effect a dedicated and unique route between a narrowband trunk and a broadband virtual channel.

10. The method of communicating information according to claim 8, wherein at least one of the first memory and the second memory is dynamically configurable at a port level.

11. The method of communicating information according to claim 10, wherein the first connection map is static and the second connection map is dynamic.

12. The method of communicating information according to claim 1, wherein the step of pre-provisioning supports a fully connected and intermeshed network of routes in which all available system bandwidth can be used to provide potential paths on all virtual channels, subject to any instantaneous transmission of ATM traffic cells.

13. An interface of a wireline communication system arranged to interconnect narrowband circuits and broadband channel resources, the interface comprising:

a memory containing a plurality of connection identifiers defining pre-provisioned connection paths between narrowband circuits and broadband channel resources; and a controller associated with the memory and arranged to control a call connection within the interface in response to call connect instructions, the controller being configured to access the pre-provisioned connection identifiers to identify an available connection path and, in response thereto, to establish the call connection using the available connection path;

wherein the memory contains pre-stored VPI/VCI information pertaining to end points of a cross-connect and the controller comprises:

means to access the stored VPI/VCI information and means to establish a connection between a narrowband trunk and a pre-provisioned network virtual channel(VC); and means to determine a VPI/VCI of a demand assigned channel and means to establish a cross-connect to a virtual channel.

14. The interface of claim 13, wherein the connection identifiers associate port addresses of the interface to pre-provisioned connection paths.

15. The interface according to claim 13, the interface being coupled to at least one call sever that administers the set-up of a call and wherein the interface further comprises a switch, wherein the interface further includes a generic end point identifying a termination point in the switch, responsive to a call server associated with a called party, and wherein the controller is further arranged to establish a virtual channel connection for an inter-node trunk based on the generic end point.

16. The interface according to claim 15, wherein the generic end point indicates an ATM address of the cross-connect of the call server associated with the called party.

17. The interface according to claim 13, further comprising:

a switch;

a plurality of network adaptors;

a first memory associated with the plurality of network adaptors, the first memory pre-provisioned with a first connection map associating narrowband trunks and virtual circuit identities; and a second memory associated with the switch, the second memory pre-provisioned with a second connection map of port addresses of narrowband trunks and port addresses of broadband channel resources.

18. The interface according to claim 17, wherein the controller is arranged to hunt for an available VPI/VCI within its associated memory to effect a dedicated and unique route between a narrowband trunk and a broadband virtual channel.

19. The interface according to claim 13, wherein in the interface is one of a network adaptor and a switch fabric.

* * * * *